(12) United States Patent
Satoh

(10) Patent No.: US 7,020,341 B2
(45) Date of Patent: Mar. 28, 2006

(54) METHOD, APPARATUS AND COMPUTER PROGRAM PRODUCT FOR IMAGE DATA COMPRESSION AND DECOMPRESSION CAPABLE OF HIGH-SPEED PROCESSING

(75) Inventor: Masaki Satoh, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 112 days.

(21) Appl. No.: 10/856,834

(22) Filed: Jun. 1, 2004

(65) Prior Publication Data

US 2004/0218819 A1 Nov. 4, 2004

Related U.S. Application Data

(63) Continuation of application No. 09/703,873, filed on Nov. 2, 2000, now Pat. No. 6,792,150.

(30) Foreign Application Priority Data

Nov. 2, 1999 (JP) .................. 11-311919

(51) Int. Cl.
*G06K 9/36* (2006.01)
(52) U.S. Cl. .................. 382/238
(58) Field of Classification Search ........ 382/232, 382/233, 238, 240, 244, 246, 248; 341/51, 341/106, 107; 375/240.5, 240.1, 240.11, 375/240.14; 348/394.1, 411.1
See application file for complete search history.

(56) References Cited

U.S. PATENT DOCUMENTS

| | | | |
|---|---|---|---|
| 5,381,145 A | 1/1995 | Allen et al. |
| 5,748,786 A | 5/1998 | Zandi et al. |
| 5,815,097 A | 9/1998 | Schwartz et al. |
| 5,881,176 A | 3/1999 | Keith et al. |
| 6,094,151 A | 7/2000 | Schwartz et al. |
| 6,359,928 B1 | 3/2002 | Wang et al. |

FOREIGN PATENT DOCUMENTS

| | | |
|---|---|---|
| JP | 10-084484 | 3/1998 |
| JP | 11-168633 | 6/1999 |
| JP | 11-266162 | 9/1999 |

*Primary Examiner*—Jose L. Couso
(74) *Attorney, Agent, or Firm*—Oblon, Spivak, McClelland, Maier & Neustadt, P.C.

(57) ABSTRACT

A compression and decompression apparatus, method and computer program product, wherein compression and decompression of image data is performed via a combination of two-dimensional reversible wavelet transform processing, context model processing, and binary entropy encode/decode processing. Faster processing, as compared to conventional devices and methods, is achieved by performing the context model processing and the binary entropy encoding/decoding processing in parallel, such that two-story pipeline processing is performed, resulting in a reduction of a basic cycle time.

44 Claims, 11 Drawing Sheets

LEVEL 0

LEVEL 1

LEVEL 2

LEVEL 3

ENCODING AREA (HIGH FREQUENCY BAND)

CONTEXT TEMPLATE

BIT-SIGNIFICANCE REPRESENTATION

| DECIMAL | 2's COMPLEMENT | SIGN MAGNITUDE | BIT-SIG-NIFICANCE |
|---|---|---|---|
| −4 | 1100 | 1100 | 11 0 0 |
| −3 | 1101 | 1011 | 0 11 1 |
| −2 | 1110 | 1010 | 0 11 0 |
| −1 | 1111 | 1001 | 0 0 11 |
| 0 | 0000 | 0000 | 0 0 0 |
| +1 | 0001 | 0001 | 0 0 10 |
| +2 | 0010 | 0010 | 0 10 0 |
| +3 | 0011 | 0011 | 0 10 1 |
| +4 | 0100 | 0100 | 10 0 0 |

TARGET POSITION OF COEFFICIENT OF
HIGH FREQUENCY BAND (DS, SD, DD)

ORDER OF MOVEMENT OF A TARGET BIT

DATAFLOW IN ENCODING

DATAFLOW IN DECODING

A: CONTEXT MODEL
B: BINARY ENTROPY ENCODER/DECODER

PROCESSING PROCEDURE IN THE ART

PROCESSING PROCEDURE ACCORDING TO THE PRESENT INVENTION (IN ENCODING)

(IN DECODING)

(IN DECODING)

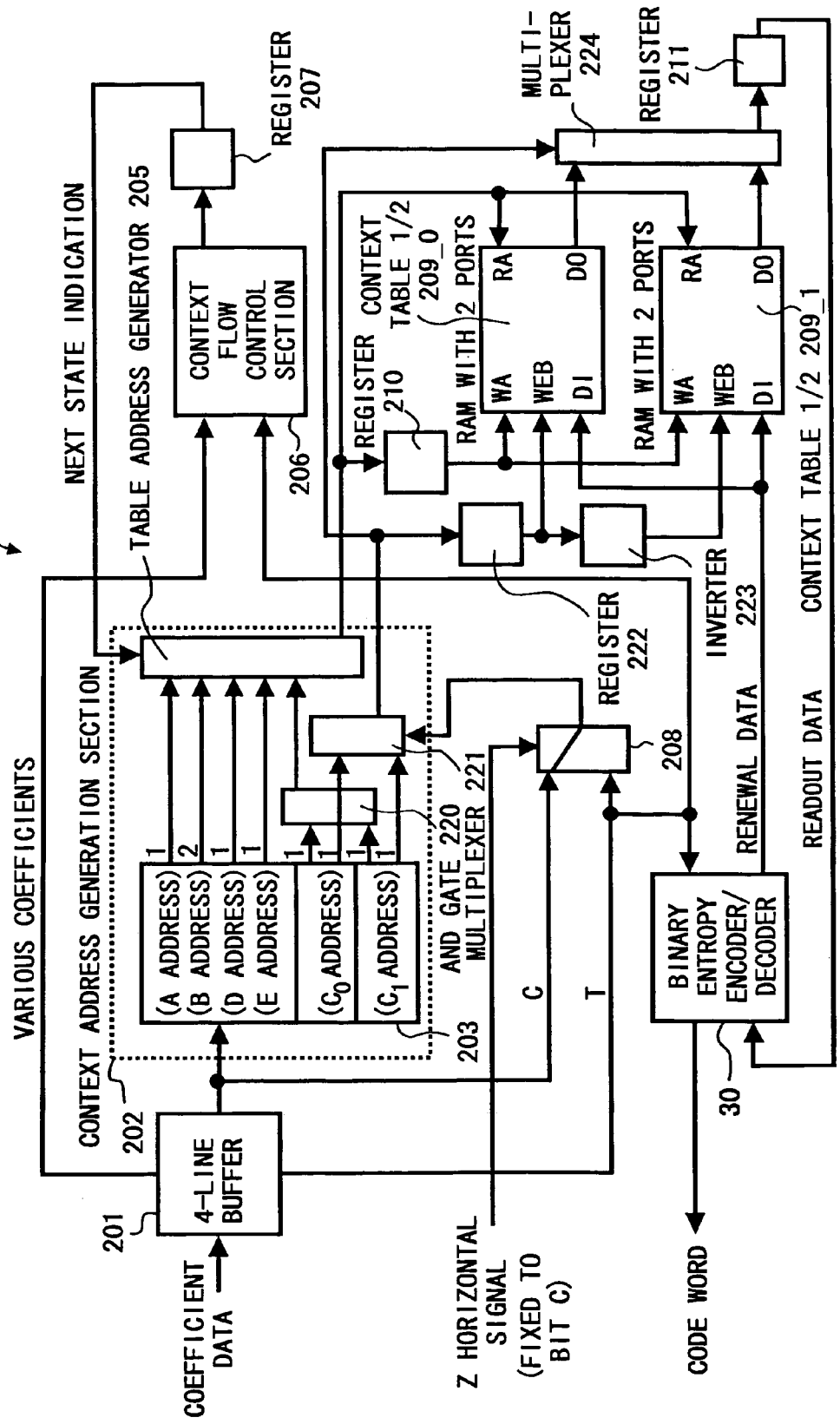

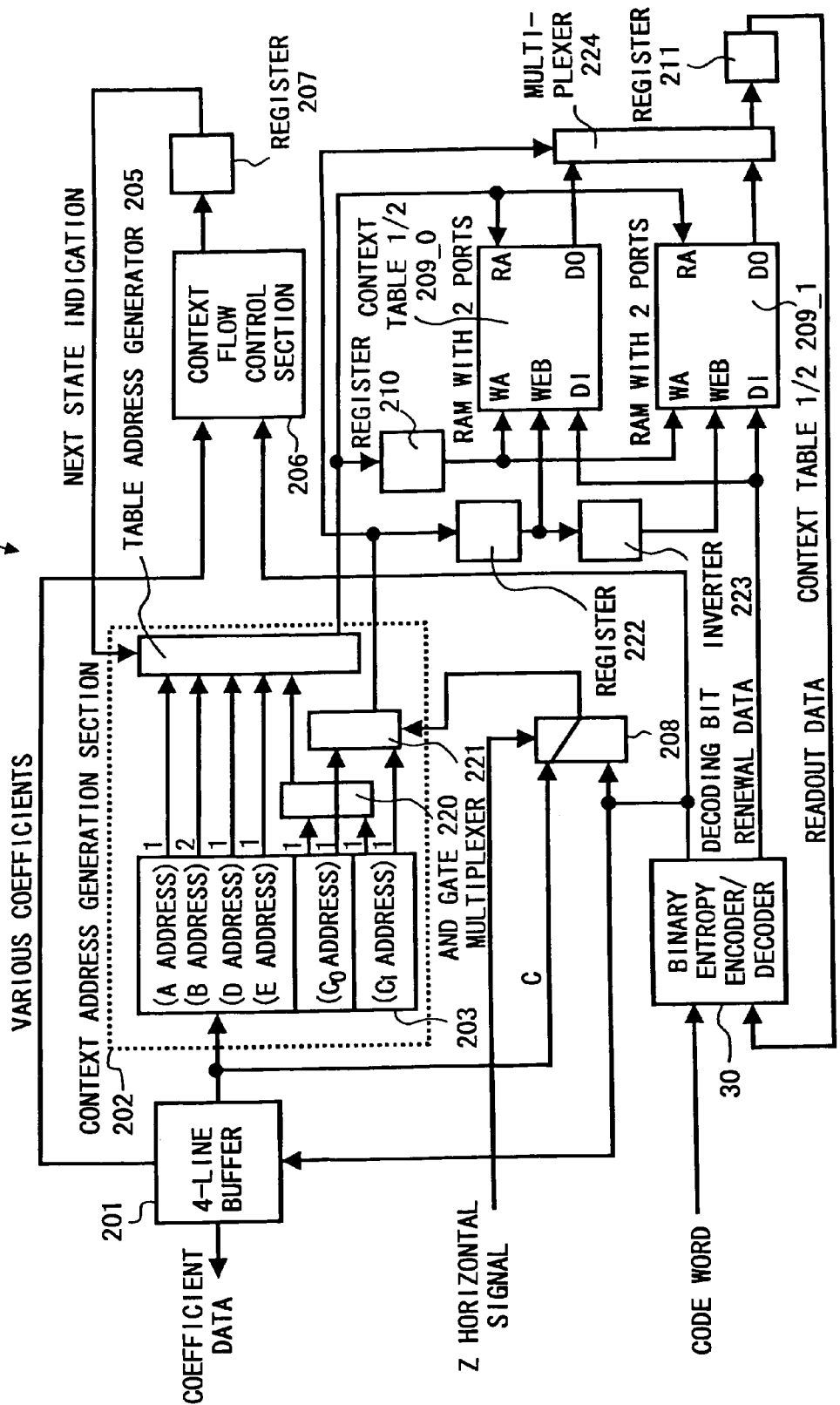

METHOD, APPARATUS AND COMPUTER PROGRAM PRODUCT FOR IMAGE DATA COMPRESSION AND DECOMPRESSION CAPABLE OF HIGH-SPEED PROCESSING

CROSS-REFERENCE TO RELATED APPLICATIONS

This application is a continuation application of Ser. No. 09/703,873 filed Nov. 2, 2000, now U.S. Pat. No. 6,792,150 and claims the benefit of priority from prior Japanese Patent Application No. 11-311919, filed Nov. 2, 1999, the entire contents which are incorporated herein by reference.

BACKGROUND OF THE INVENTION

1. Field of the Invention

The present invention relates to an image processing system, and more particularly, to a method, apparatus and computer program product for compressing and decompressing image data.

2. Discussion of the Background

Japanese Patent Laid-Open Publications Nos. 10-084484, 11-168633, and 11-266162 describe compression and decompression of image data by a combination of two-dimensional reversible wavelet transform processing, context model processing, and binary entropy encoding/decoding processing. Such compression and decompression devices and those according to the present invention generally include five processing blocks, as shown in FIG. 1. These processing blocks include, for example, a two-dimensional reversible wavelet transform section 10, a context model section 20, a binary entropy encoder/decoder 30, and an integration order generation section 50 perform compression and decompression of image data. For example, a FSM (Finite State Machine) coder based on a finite state machine is used as the binary entropy encoder/decoder 30.

The operation of such compression and decompression devices will now be explained. It is assumed that each device divides one component image (e.g., one of a Red, Green and Blue image) into tiles, and performs tile-by-tile image processing. First, the operation of the device in encoding (i.e., compressing) image data will be described. Based on an order transformation, performed by the two-dimensional reversible wavelet transform section 10, image data of one tile is spatially divided into frequency bands, for example, as shown in FIGS. 2A–2D, and coefficient data of each frequency band is provided to the context model section 20. Because a low frequency band is recursively spatially divided, coefficient data of each frequency band shown in FIG. 2D is obtained when image data is transformed into three levels.

In the integration order generation section 50, a bit to be encoded (hereinafter referred to as a target bit) is determined based on order of alignment information (i.e., information which indicates the order of encoding) designated by a user. In the context model section 20, context data is created based on the state of the bits (i.e., each bit of a context template shown in FIG. 3) around the target bit, and the binary entropy encoder/decoder 30 receives the generated context data.

In the binary entropy encoder/decoder 30, the target bit is encoded using probability estimation based on the context data and the target bit so as to generate a code word. Then, a code stream of one tile is output after tag information, including a compression condition, has been added to a header of the code word via a tag processing section 40.

In a wavelet transform, coefficient data, corresponding only to the coefficient data of a high frequency band (DS, SD, DD) shown via shading in FIGS. 2B, 2C and 2D, is encoded. Then, the coefficient data of a low frequency band (SS) is output without encoding into a code stream. In a three-level wavelet transformation, the coefficient data of a high frequency band shown via shading in FIG. 2D is encoded, and the coefficient data of a low frequency band (SS3) is not encoded.

Decoding is performed via a method similar to the above-described encoding method. In addition, the encoding and decoding of the coefficient data is performed from the most significant bit data to the least significant bit data, at every bit plane.

In a decompression (i.e., decoding) process, image data of one tile is created from a code stream of one tile and is the reverse of a compression (i.e., encoding) process. In this case, a target bit position is determined in an integration order generation section 50, based on tag information at the header of a codestream. Then, context data is created in the context model section 20 based on a state of the bits (i.e., which have already been encoded) around the target bit.

In the binary entropy encoder/decoder 30, decoding is performed using probability estimation based on the context data and the codestream, and the decoded bit is output. The decoded bit is written into a target bit position of a buffer in the context model section 20. Thus, coefficient data of each frequency band is restored. The coefficient data is reverse transformed by the two-dimensional reversible wavelet transform section 10, and image data of one tile is reconstructed.

The tag processing section 40 adds tag information to a compressed codestream and interprets the tag information added to the codestream. In a compression (i.e., encoding) process, the tag processing section 40 combines a plurality of components formed in one tile in a predetermined order, so as to generate one codestream. The tag processing section 40 then adds tag information to the header of the codestream. In a decompression (i.e., decoding) process, the tag processing section 40 interprets tag information and resolves one codestream into a plurality of components in one tile.

In such devices as described above, wavelet transformed coefficient data is encoded with a bit-significance representation, as shown in FIG. 4. Generally, in "2's complement" and "sign+magnitude" representations, the sign is represented by the uppermost bit. In contrast, in a bit-significance representation, an absolute value of a coefficient value is examined from an upper bit to a lower bit to determine the first logic "1" bit (e.g., referred to as a "1" head bit). The sign bit is encoded right after the encoding of the "1" head bit. Bits having logic values of "0" and located at higher bit positions than the "1" header bit are referred to as "0" header bits. Bits having logic values of "0" or "1" and located at lower bit positions than the "1" head bit are referred to as tail bits.

Referring to FIG. 5, a bit from each high frequency band (i.e., one of DS, SD, and DD) is examined with respect to a coefficient word of a pixel (i.e., in a depth direction) from MSB (the most significant bit) to LSB (the least significant bit). When the "1" head bit (i.e., the bit circled in FIG. 5) is a target bit, a sign bit S of the coefficient word is encoded (or decoded), immediately after the "1" head bit is encoded (or decoded). Then, a bit in the next target position is encoded (or decoded). When a target bit is a bit (i.e., including tail bits) other than the "1" head bit, the next target bit is encoded (or decoded) instead of the sign bit S, after the target bit has been encoded (or decoded). Namely, a sign bit is encoded (or decode) together with the "1" head bit.

As described above, encoding (or decoding) of each high frequency band is performed in order of significant bits at every bit plane. However, a target bit moves in the order as shown in FIG. 6 in each bit plane. Accordingly, the target bit moves in a zigzag order of T0, T1, T2, and T3 in a left most 2×2 pixel region. Then, the target bit moves in a zigzag order of T4, T5, T6, and T7 in the next 2×2 pixel region. This process is repeated until all the bits are encoded (or decoded).

Such devices as discussed above, generally, are implemented via specific hardware, when processing speed higher than that of an implementation using software and a personal computer or workstation is required. In addition, dataflow in the context model section 20 and between the context model section 20 and the binary entropy encoder/decoder 30 is arranged in series, as shown in FIGS. 7 and 8. Further, the context model section 20 and the binary entropy encoder/decoder 30 are serially operated as shown in FIG. 9A.

In such devices, processing time required for compression and decompression is determined by multiplying a basic cycle time by the number of processing cycles. However, the shortening of the basic cycle time is limited because the processing is performed in series, as described above. In addition, in contrast to the encoding operation, because a decoded bit is used as a context template in a decoding operation, a feedback loop, shown as a dotted line in FIG. 8, is required, which makes it difficult to shorten the basic cycle time.

In order to shorten a processing time required for compression and decompression, two or more sets of the context model section 20 and the two-element entropy encoder/decoder 30 might be employed so as to operate them in parallel. However, simply operating such device in parallel typically cannot reduce the number of processing cycles, resulting in deterioration of compression efficiency.

SUMMARY OF THE INVENTION

The present invention has been made in view of the above and other problems and addresses the same.

The present invention advantageously provides a novel compression and decompression apparatus, method and computer program product, wherein compression and decompression of image data is performed via a combination of two-dimensional reversible wavelet transform processing, context model processing, and binary entropy encode/decode processing. Faster processing, as compared to conventional devices and methods, is achieved according to the present invention by performing the context model processing and the binary entropy encoding/decoding processing in parallel, such that two-story pipeline processing is performed, resulting in a reduction of a basic cycle time.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 13 is a block diagram of a context model section for illustrating a relation between input and output signals during encoding, according to another embodiment of the present invention; and FIG. 14 is a block diagram of a context model section for illustrating a relation between input and output signals during decoding, according to another embodiment of the present invention.

DETAILED DESCRIPTION OF THE PREFERRED EMBODIMENTS

Figure 1:
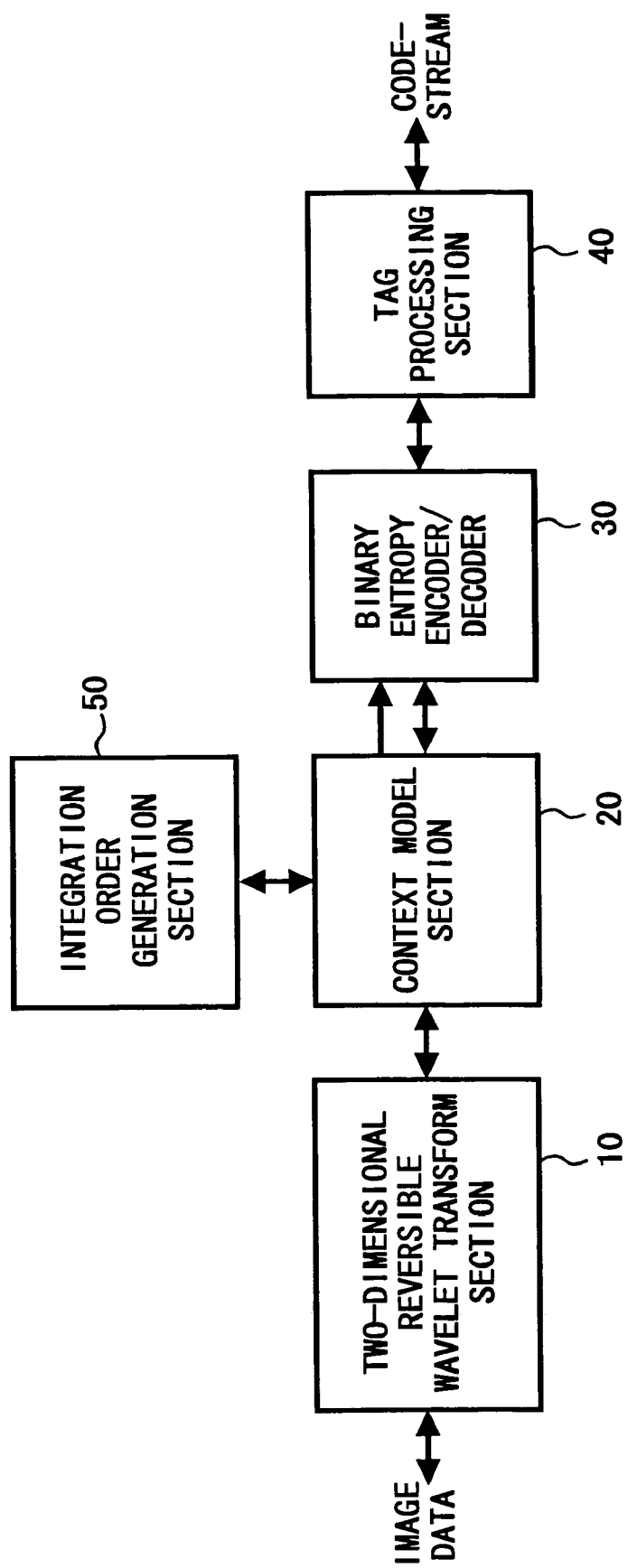
FIG. 1 is a block diagram illustrating a compression and decompression apparatus, according the present invention.
Figure 2A:
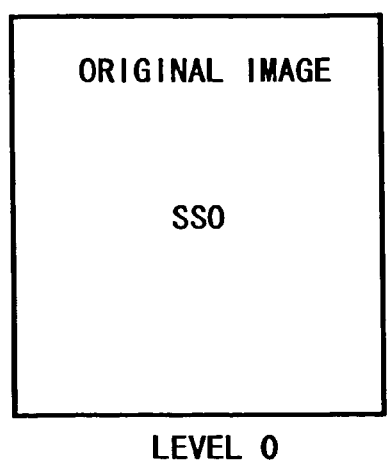
FIGS. 2A–2D illustrate exemplary spatial division of a frequency band by a two-dimensional reversible wavelet transformation.
Figure 2B:
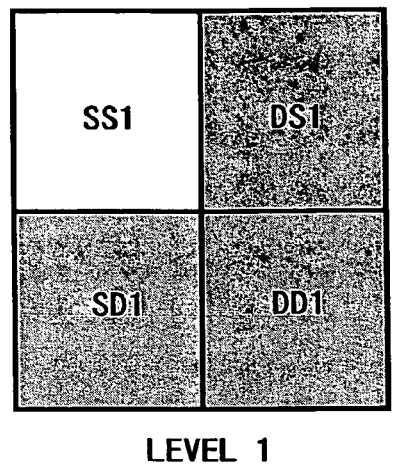
Figure 2C:
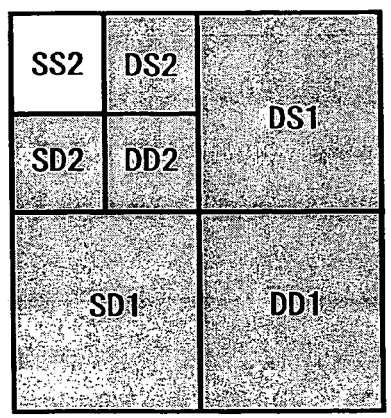
Figure 2D:
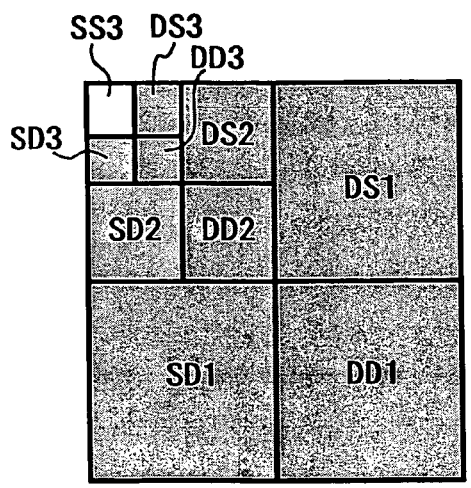
Figure 2D:

Referring now to the drawings, wherein like reference numerals designate identical or corresponding parts throughout the several views, which illustrate various embodiments of the present invention, as will now be described.

Figure 9A:
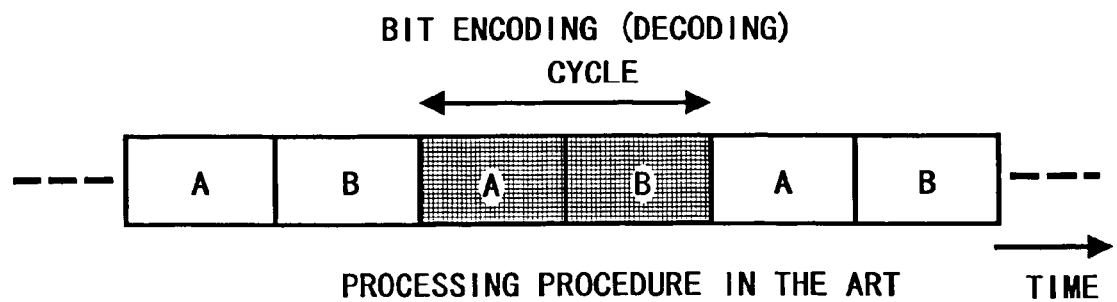
FIG. 9A is a diagram for illustrating a decoding procedure in a background art image data compression and decompression system.
Figure 9B:
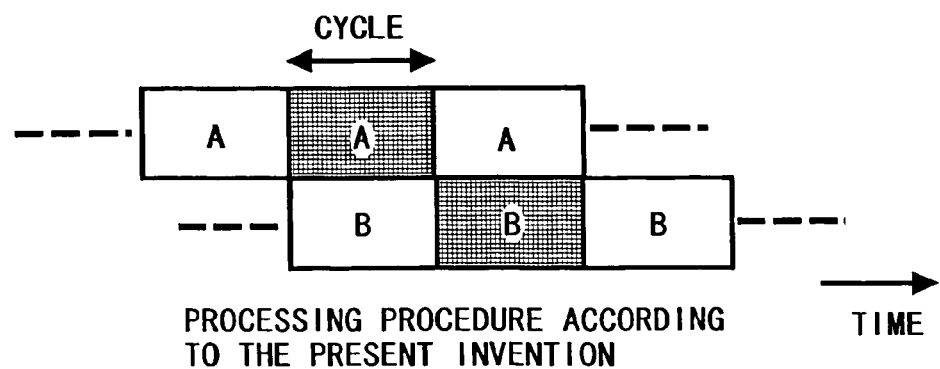
FIG. 9B is a diagram for illustrating a decoding procedure, according to the present invention.
Figure 10:
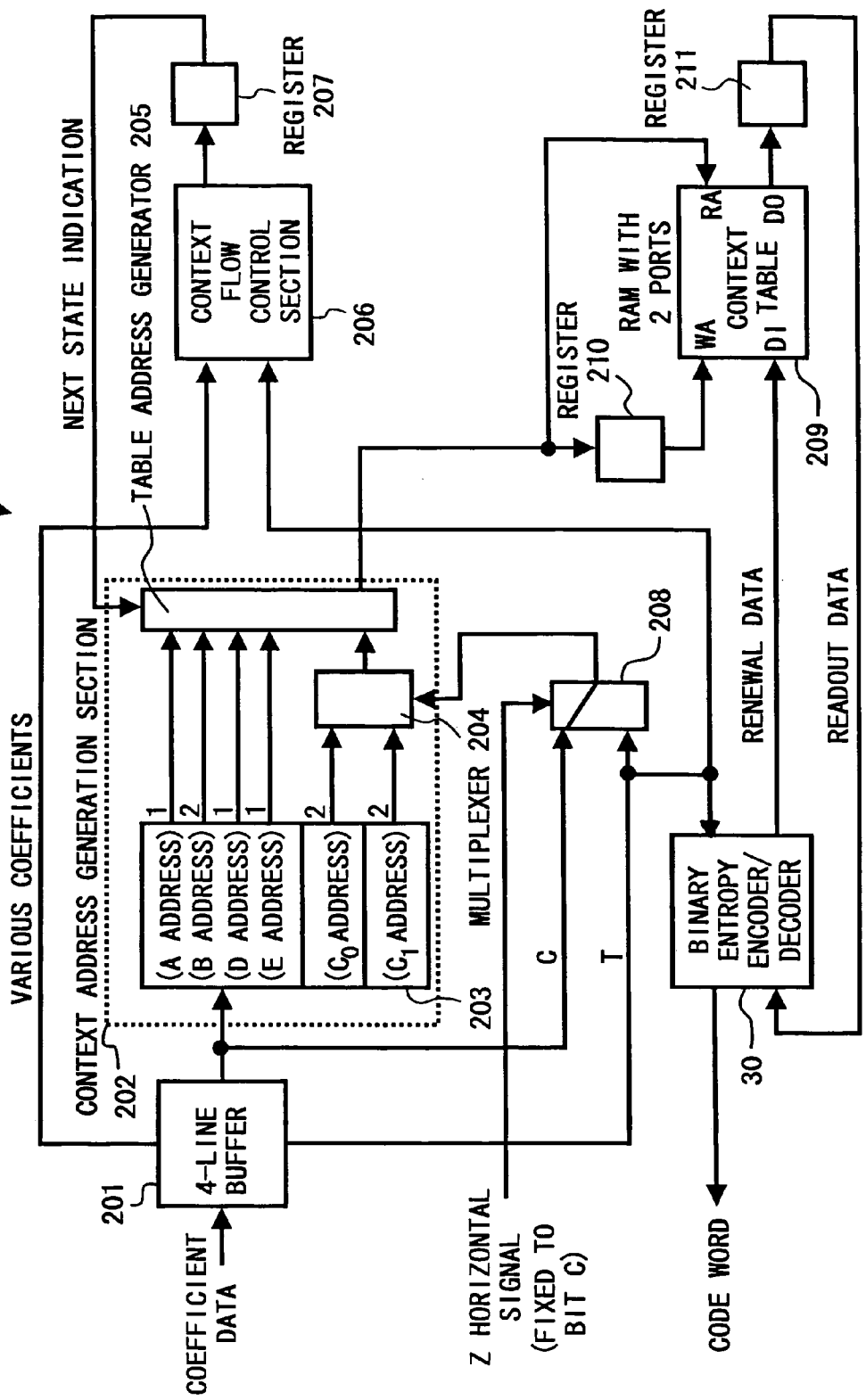
FIG. 10 is a block diagram of a context model section for illustrating a relation between input and output signals during encoding, according to an embodiment of the present invention.
Figure 11:
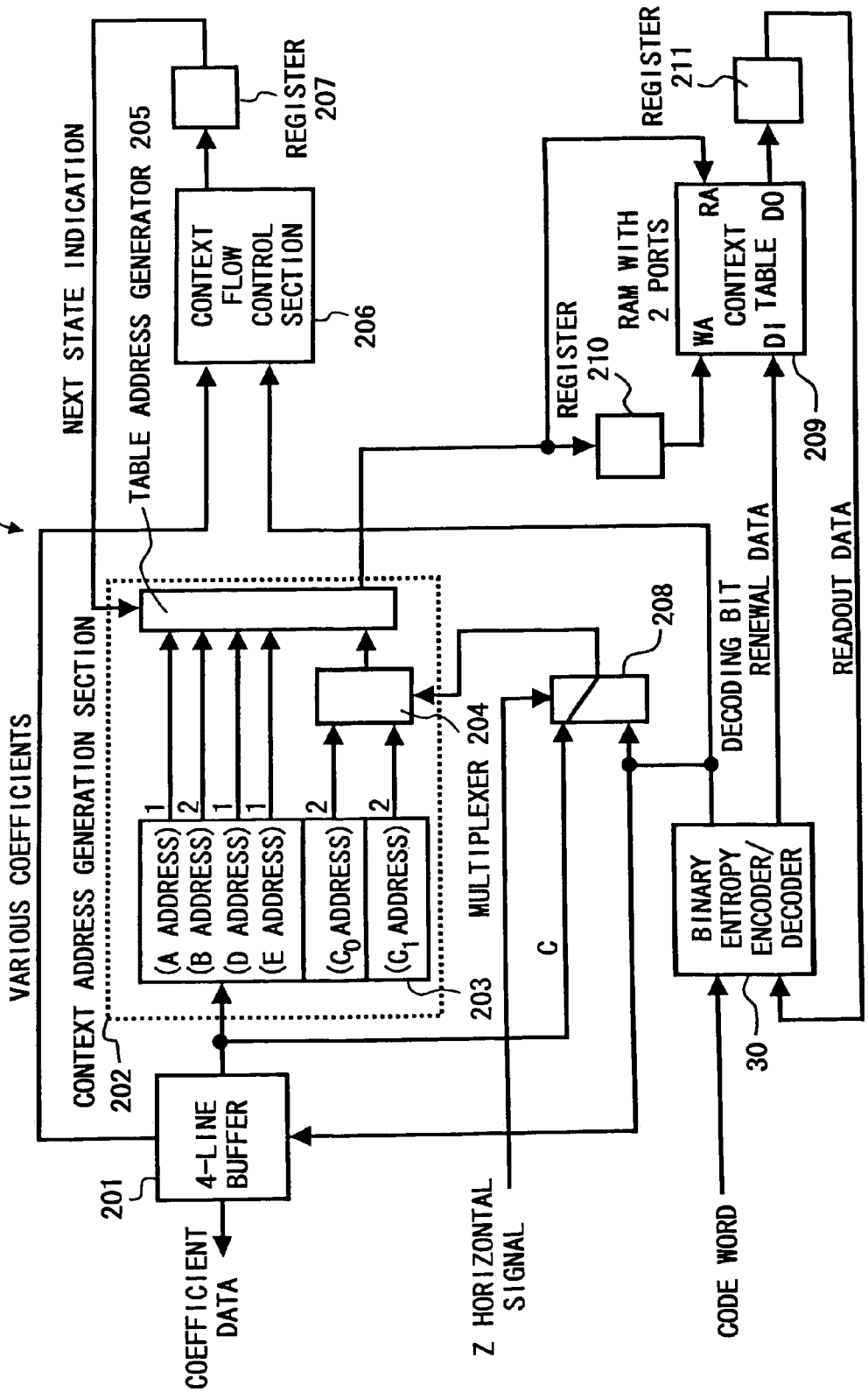
FIG. 11 is a block diagram of a context model section for illustrating a relation between input and output signals during decoding, according to an embodiment of the present invention.
Figure 12:
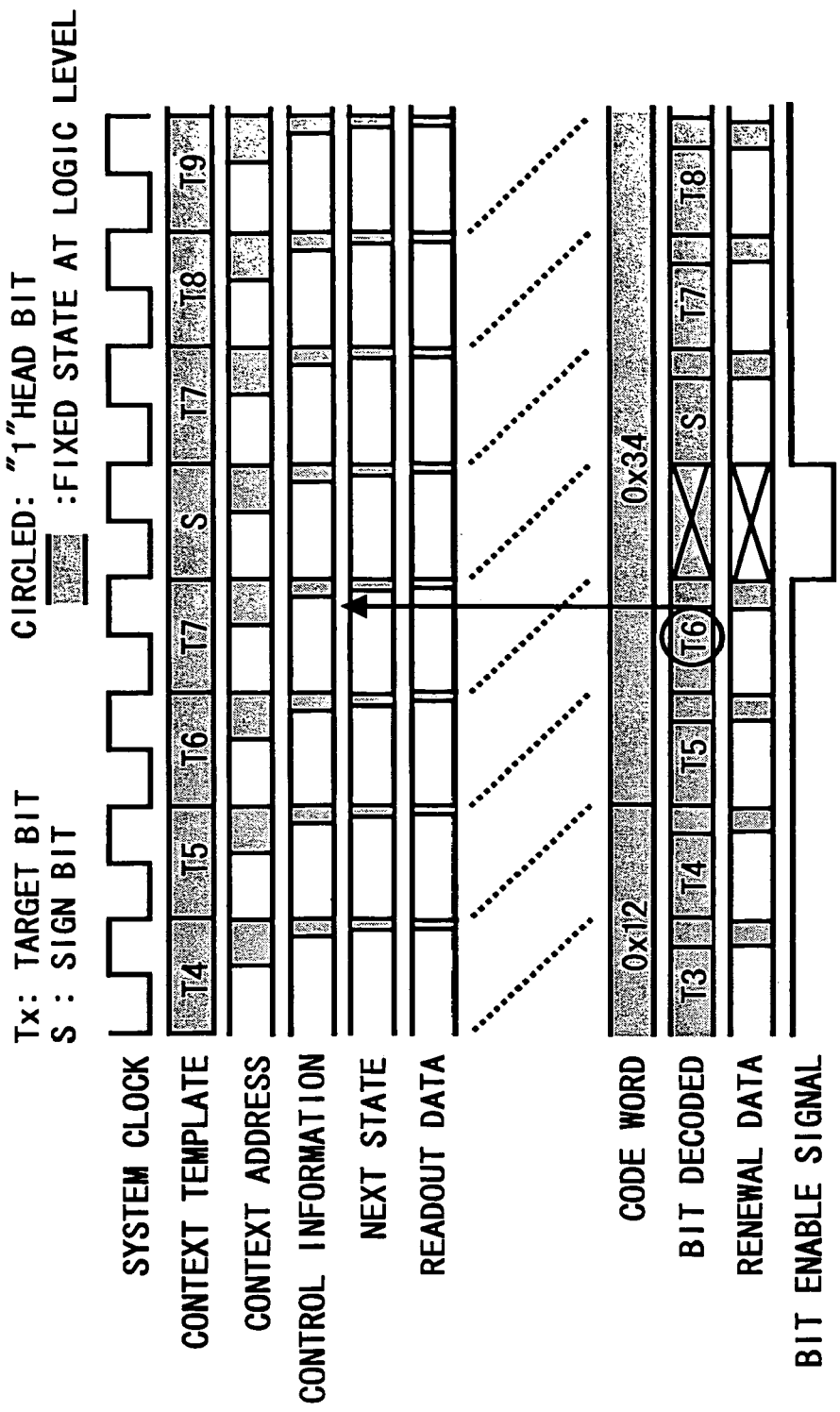
FIG. 12 is a timing diagram for describing a decoding operation, according to an embodiment of the present invention.

According to an embodiment of the present invention, a compression and decompression apparatus, constructed as shown in FIG. 1, includes a context model section 20 configured as shown in FIGS. 10 and 11. The context model section 20 and a binary entropy encoder/decoder 30 operate in parallel and perform a two-story pipeline processing as shown in FIG. 9B. FIGS. 10 and 11 explain relationships between input and output signals during encoding and decoding, respectively. FIG. 12 is a timing diagram for illustrating the decoding process.

Figure 6:
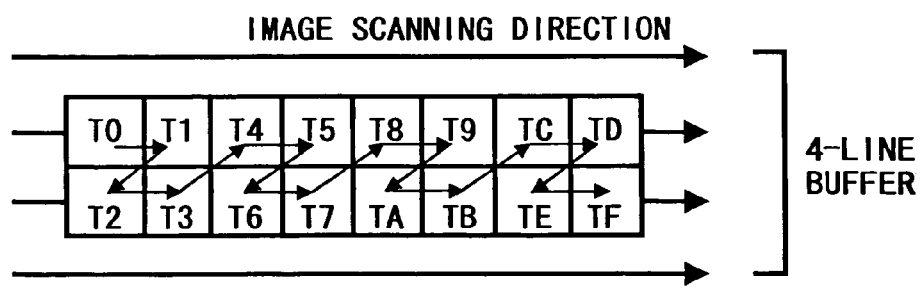
FIG. 6 is a diagram for illustrating the processing of a target bit.
Figure 7:
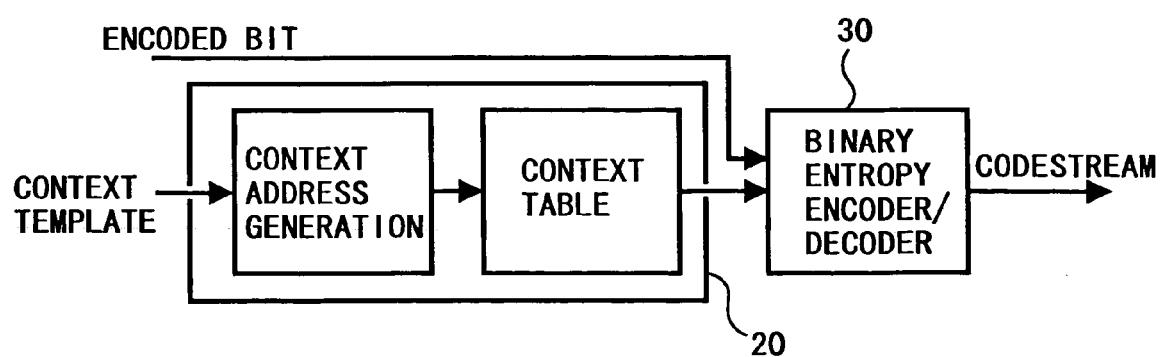
FIG. 7 is a block diagram illustrating dataflow during encoding in a background art image data compression and decompression system.

The binary entropy encoder/decoder 30 in FIGS. 1, 10 and 11 is implemented, for example, as a FSM (Fine State Machine) coder. The context model section 20 includes a 4-line buffer 201 for temporarily storing, for example, four lines of coefficient data as shown in FIGS. 6, 10 and 11. The context model section 20 further includes a context address generation section 202, a context table 209 accessed by using a context address output from the context address generation section 202. A context flow control section 206 controls the flow for context model processing. A multiplexer 208 is provided for performing context address generation. A register 207 is provided for latching a next state indication received from the context flow control section 206. A register 210 is provided for latching a generated context address. A register 211 is provided for latching context data read from a context table 209. The context address output from the context address generation section 202 is provided to the context table 209 as a read address. The context address is also sent to the context table 209 as a write address after being latched by the register 210. The context data latched by the register 211 is fed back to the binary entropy encoder/decoder 30.

Figures 3, 4:
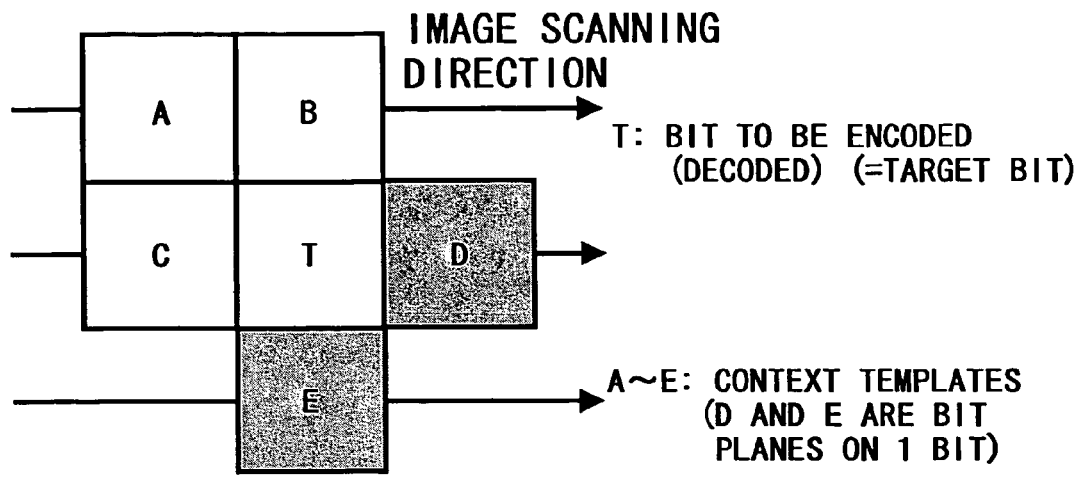
FIG. 3 is a diagram for illustrating the operation of a context template.
FIG. 4 is a table for illustrating data having a bit-significance representation.

The context address generation section 202 includes an address generator 203, which receives bits A, B, C0, C1, D and E of a context template (FIG. 3) from the 4-line buffer 201, and generates a context address according to a state of each bit input. A multiplexer 204 receives bits C0 and C1 and provides an output to a table address generator 205, which creates a context address (i.e., a table address) corresponding to an address allocation of the context table 209. A next state indication latched by the register 207 is provided to the table address generator 205. A decoding bit output from the binary entropy encoder/decoder 30 is provided to the context flow control section 206.

A context address generated by the address generator 203 includes 1 bit or 2 bits of address information corresponding to each bit of A, B, D, and E in a context template (i.e., address A, address B, address D, and address E in FIGS. 10 and 11). The context address generated by the address generator 203 also includes 2 sets of 2-bit address information corresponding to bit C in the context template (i.e., address C0 and address C1 in FIG. 10 and 11). The address C0 is the address information assuming that bit C input into the addresses generator 203 is "0", and the address C1 is the address information assuming that bit C is "1". The address generator 203 simultaneously creates two context addresses. The first context address includes addresses A, B, C0, D and E for a case where the bit C is "0". The second context address includes addresses A, B, C1, D, and E for a case where bit C is "1."

The multiplexer 204 selects either address C0 or address C1 and provides the selected address to the table address generator 205. Both of context addresses, for cases where bit C is "1" or "0", are created. One of the context addresses is selected depending on whether the multiplexer 204 selects address C0 or the address C1. The selected context address is output as a context address to the context table 209 via the table address generator 205. Such a structure for context address generation, as described above, is effective, especially, during a decoding operation, as will now be described below.

An input selection of the multiplexer 204 is controlled by an output of the multiplexer 208. A target bit moves in a Z-like manner, as preciously described with respect to FIG. 6. A selection of the input of the multiplexer 208 is controlled by a Z horizontal signal output corresponding to the Z-like movement of the target bit. During encoding, the Z horizontal signal is fixed, such that the multiplexer 208 always selects bit C (i.e., a bit positioned on the left side of the target bit) provided by the 4-line buffer 201. During decoding, the selection of the multiplexer 208 changes according to the movement of the target bit, i.e., in a horizontal direction or in a slanting direction of the Z-like movement. The multiplexer 208 selects an appropriate decoding bit T output (i.e., the target bit one processing cycle prior, corresponding to decoded bit C positioned on the left side of the current target bit) from the binary entropy encoder/decoder 30 when the target bit moves in the horizontal direction. The multiplexer 208 selects an appropriate bit C provided by the 4-lien buffer 201 when the target bit moves in the slanting Z-like direction. The multiplexer 204 selects address C0 when an output from the multiplexer 208 is "0" and address C1 when the output from the multiplexer 208 is "1".

During encoding, context data is read out from the context table 209 according to a context address formed by the context address generation section 202, and is provided to the binary entropy encoder/decoder 30 through a register 211. The binary entropy encoder/decoder 30 outputs a code word by encoding a target bit T provided by the 4-line buffer 201 and by using the given context data. The binary entropy encoder/decoder 30 also outputs renewal data. In the context table 209, the data corresponding to the address designated by the register 210, i.e. the data corresponding to the same address from which context data has been readout, is rewritten by the renewal data. The multiplexer 208 always selects bit C given by the 4-line buffer 201, namely, a bit positioned on the left side of a target bit. Therefore, the multiplexer 204 selects address C0 when bit C is "0", and a context address when bit C being "0" is output from the table address generator 205. When bit C is "1", the multiplexer 204 selects address C1 and a context address when bit C is "1" is output from the table address generator 205.

In decoding, context data is read out from the context table 209 in accordance with a context address output from the context address generation section 202, and is fed to the binary entropy encoder/decoder 30 through the register 211. The binary entropy encoder/decoder 30 decodes a code word input from outside using the context data, and outputs a decoding bit as well as renewal data. The decoded bit is written in a corresponding bit position of the 4-line buffer 201. The context table 209 is rewritten by the renewal data. The multiplexer 208 selects a decoding bit output from the binary entropy encoder/decoder 30 when a target bit moves in a horizontal direction. The decoding bit output indicates a state of the target bit one processing cycle before, i.e., it indicates a state of bit C positioned on the left side of the target bit in the current processing cycle. In a later step in a processing cycle, the multiplexer 204 selects address C0, when a decoding bit input is "0", and selects address C1, when a decoding bit input is "1". Then, the context address generation section 202 outputs a context address corresponding to the address selected by the multiplexer 204.

Figure 8:
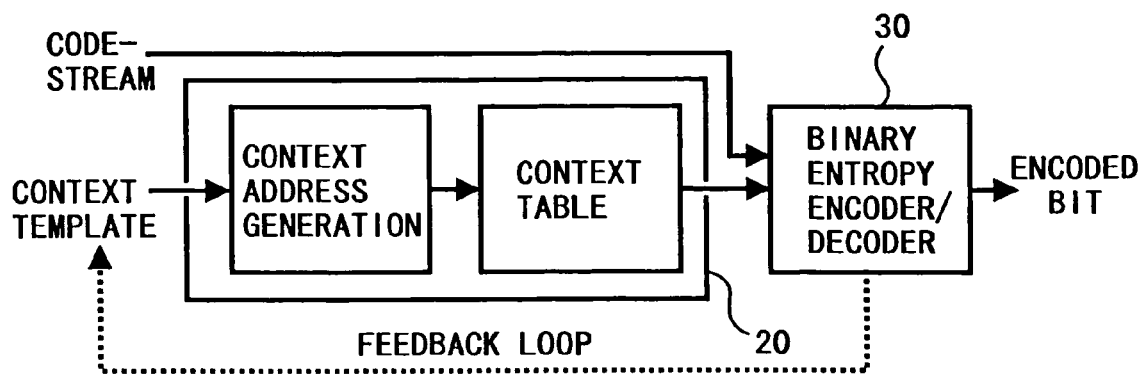
FIG. 8 is a block diagram illustrating dataflow during decoding in a background art image data compression and decompression system.

As described above and referring to FIGS. 8 and 11, during decoding, a feedback loop problem occurs when a decoded bit is used again as bit C of a context template for a next target bit. According to an embodiment of the present invention, two context addresses for cases where bit C is "0" and "1" are created in advance focusing on the fact that the decoding bit is either "0" or "1". When a decoded bit to be output from the binary entropy encoder/decoder 30 is determined, either of the two context addresses is selected and used depending on a state of the decoded bit output, while directly referring to a state of the decoding bit. Thus, a delay in creating a context address (i.e., which is equivalent to a delay caused by a feedback loop in FIG. 8), is prevented. Such as a delay is caused in a system in which a decoded bit is written once in the 4-line buffer 201 and then is fed back, as shown in FIG. 8, before creation of a context address. Accordingly, the present invention performs parallel operations of the context model section 20 and the binary entropy encoder/decoder 30 efficiently, resulting in increased processing speed.

The feedback loop problem, however, does not occur when a target bit moves in a slanting direction, because a decoded bit is not used as a context bit for the next processing cycle. In this case, bit C read out from the 4-line buffer 201 by the multiplexer 208 is selected as described above, and then, the multiplexer 204 selects either address C0 or address C1 according to a value of bit C.

Figure 5:
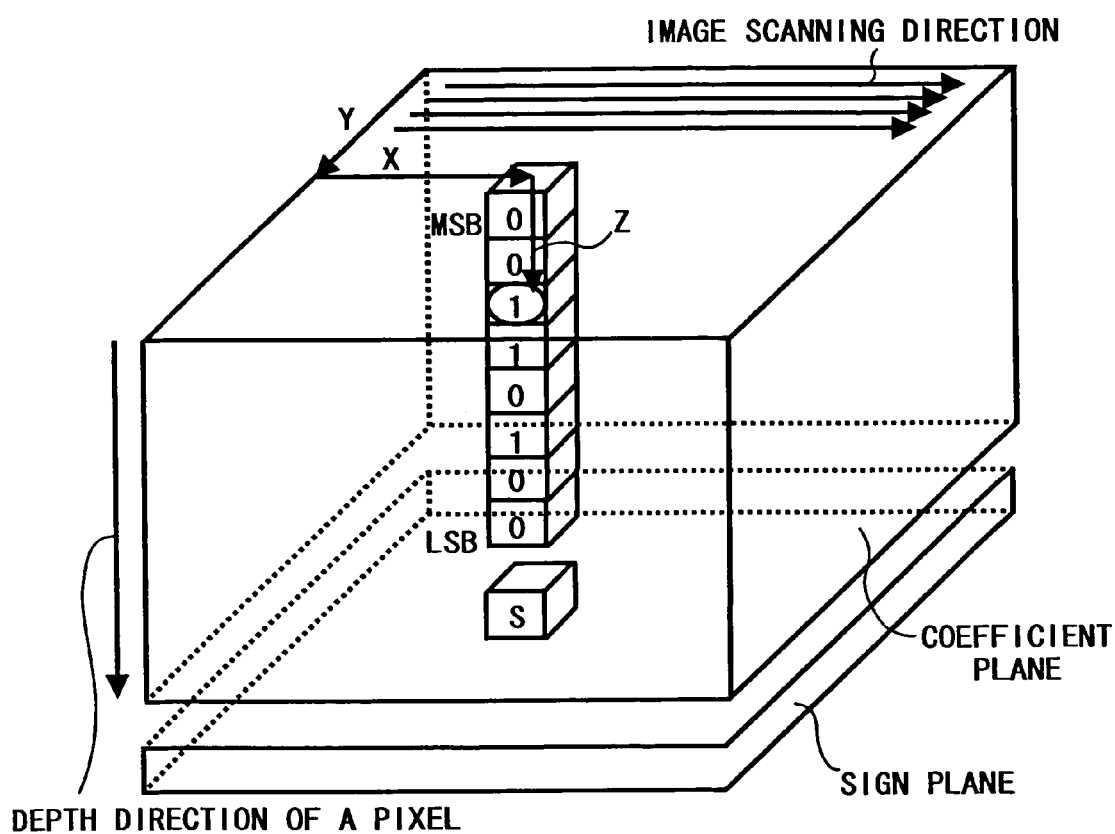
FIG. 5 is a diagram for illustrating the operation of encoding or decoding a "1" head bit and sign bit.

As described above and referring to FIG. 5, when a target bit is a "1" head bit, encoding (or decoding) of sign bit S is performed immediately after the "1" head bit has been encoded (or decoded). For example, when encoding (or decoding) is performed in the order shown in FIG. 6, and when the encoded (or decoded) bit of T6 is a "1" head bit, the context address of T7 has already been created in the cycle. This is due to the two-story pipeline processing according to the present invention. Therefore, one-cycle delay cycle is inserted while the T6 bit is retained. Then, encoding (or decoding) of sign bit S is performed after a context address for the sign bit S has been created, and the encoded (or decoded) bit of T7 is invalidated. In the next cycle, the encoded (or decoded) bit of the sign bit S is activated, and a context address for T7 is generated again. During decoding, the decoded bit of T6 is used as the context bit C when a target bit moves in a horizontal direction, e.g. from T6 to T7 in FIG. 6.

FIG. 12 shows a timing diagram of the decoding operation when T6 is a "1" head bit. As shown in FIG. 12, the decoded bit of T7 is invalidated, when a bit enable signal is at a low level, and a rewrite of the context table 209 is prohibited. Then, the sign bit S is decoded in the next cycle.

According to the first embodiment of the present invention, a RAM (Random Access Memory) with 2 ports or a register is used as the context table 209, and a write-through operation can be performed when data is written to the context table 209. That is, both a renewal of the identical address of the context table 209 and a readout of the renewed data can be performed in one processing cycle, and encoding and decoding processing time can be relatively shortened compared to when a single port RAM is used.

According to the second embodiment of the present invention, the context model section 20 of the compression and decompression apparatus is configured as shown in FIGS. 13 and 14. The apparatus performs two-story pipeline processing as shown in FIG. 9B, by operating the context model section 20 and the binary entropy encoder/decoder 30 in parallel. FIGS. 13 and 14 are also used to explain a relation between input and output signals during encoding and decoding, respectively.

According to the second embodiment of the present invention, two context tables 209_0 and 209_1 are provided in the context model section 20. The context table 209_0 is used to store context data when bit C of a context template is "0". The contexts table 209_1 is used for storing context data when bit C of the context template is "1". Both of the context tables include either a RAM with 2 ports or a register, and provide a write-through capability.

In the context address generation section 202, one bit of the C0 address and the C1 address output from the address generators 203 is input to an AND gate 220. The output from the AND gate 220 is input to the table address generator 205. A context address output from the table address generator 205 is provided to the two context tables 209_0 and 209_1 as a read address, while being simultaneously provided to the context tables 209_0 and 209_1 as a write address through the register 210. A multiplexer 221 selects either of the remaining single bits of the C0 address and the C1 address. The multiplexer 208 control an input selection of the multiplexer 221, in as similar manner as described with respect to the multiplexer 204 of the first embodiment.

A register 222 latches an output from the multiplexer 221. A signal output from the register 222 is used as a write enable signal for the context table 209_0. A signal, which is an output signal from the register 222 logically inverted by the inverter 223, is used as a write enable signal to the context table 209_1. Although data from the context tables 209_0 and 209_1 are simultaneously read out, a multiplexer 224 select only one of the two data read out. The register 211 latches the selected data as context data. A selection of input of the multiplexer 224 is controlled by an output of the multiplexer 221.

During encoding or decoding, a context address, which is common to both when bit C is "0" or "1", is output from the table address generator 205. The context data when bit C is "0" is read out from the context table 209_0, and the context data when bit C is "1" is also simultaneously read out from the context table 209_1. During encoding, the multiplexer 221 selects 1 bit from address C0 when bit C read out from the 4-line buffer 201 is "0". As a result, the multiplexer 224 select the context data read out from the context table 209_0. The selected context data is latched by the register 211, and then is provided to the binary entropy encoder/decoder 30. With a write enable signal being active, the context table 209_0 is rewritten with the renewal data output from the binary entropy encoder/decoder 30. When bit C is "1", data read out from the context table 209_1 is selected, and is provided to the binary entropy encoder/decoder 30. The context table 209_1 is rewritten with the renewal data output from the binary entropy encoder/decoder 30 when the write enable signal is active.

During decoding, data read out from the context table 209_0 or 209_1 is selected. Either of the data read out then is selected depending on whether a decoding bit output from the binary entropy encoder/decoder 30 is "0" or "1" corresponding to when a target bit moves in a horizontal direction in the Z-like movement. In addition, either of the data read out is selected depending on whether bit C provided by the 4-line buffer 201 is "0" or "1" corresponding to when a target bit moves in a slanting direction in the Z-like movement. Thus, the rewriting of data is effectuated.

Accordingly, two context data, for cases where a bit positioned on the left side of a target bit is "0" and "1", are read out in advance from the context table 209_0 and 209_1 respectively, and one of the two data is selected. Therefore, reading of the context tables 209_0 and 209_1 is performed earlier than that of the first embodiment. Therefore, although a composition of the apparatus according to the second embodiment becomes relatively complicated compared with the composition in the first embodiment, processing speed is improved.

In a preferred embodiment of the present invention, the context model section 20 and the binary entropy encoder/decoder 30 are integrated onto a same IC chip. As described above, the context model section 20 and the binary entropy encoder/decoder 30 are closely related to each other, and bit information is frequently exchanged between them. This is advantageous for increasing a processing speed when both the context model section 20 and the binary entropy encoder/decoder 30 are placed on a same IC, because a wiring delay in exchanging the information can easily be reduced.

The result of a simulation as to how the processing speed can be increased by applying the present invention to an existing compression and decompression apparatus using a logical synthesis tool will now be described below. The following values represent a percentage of time spent in each processing step, assuming that a basic cycle time spent for encoding (or decoding) a target bit is 100%. Time spent for an integration order generation is included into a context address generation processing time.

(1) Processing time for generating context address: 33%.

(2) Readout time for reading out context table: 17%.

(3) Processing time for the binary entropy coder/decoder: 40%, (4) Processing time for controlling context flow: 10%.

The above results show that 70% or more of the basic cycle time are spent during the context address generation process and the binary entropy encoding/decoding process. Consequently, it is considered that 1 processing cycle time can be shortened by about a half, when a 2-story pipeline processing is carried out by a parallel operation of the context model section 20 and the binary entropy encoder/decoder 30.

It was confirmed that a processing time can be reduced by about 43% in the first embodiment and by about 50% in the second embodiment, respectively, according to the simulation performed based on the above-described precondition of the ratio of the processing time by using the same logical synthesis tool.

According to the present invention, because the processing performed by the tag processing section 40, the integration order generation section 50, and the two-dimensional reversible wavelet transform section 10 is performed on a byte-by-byte or a word-by-word basis, such processes typically have little effect on the processing speed of the device as a whole. Accordingly, such functions may be performed via software operating under control of a DSP (digital signal processor) or a CPU (central processing unit). In contrast, since the processing performed by the context model section 20 and the binary entropy encoder/decoder 30 is performed on a bit-by-bit basis, a specific hardware implementation is used to perform such functions when high-speed processing is required.

Further, in order to shorten a processing time required for compression and decompression, two or more sets of the context model section 20 and the two-element entropy encoder/decoder 30 might be employed so as to operate them in parallel. However, various functions (e.g., various quantization functions performed via bit plane encoding, a progressive reproduction/display function performed via bit plane transmission, etc), which are features of the compression and decompression apparatus of the present invention, typically cannot be performed via a simple parallel implementation approach in order to reduce the number of processing cycles. Therefore, a simple parallel implementation approach typically results in deterioration of compression efficiency.

The mechanisms and processes set forth in the present invention may be implemented using one or more conventional general purpose microprocessors and/or signal processors programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits, by interconnecting an appropriate network of conventional component circuits or by a combination thereof with one or more conventional general purpose microprocessors and/or signal processors programmed accordingly.

The present invention thus also includes a computer-based product which may be hosted on a storage medium and include instructions which can be used to program a microprocessor to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 11-311919, filed on Nov. 2, 1999, the entire contents of which is incorporated by reference herein.

The invention claimed is:

1. A compression apparatus, comprising:
an input device configured to input image data;
a two-dimensional reversible wavelet transform section configured to divide the image data into frequency bands and reversibly divide a low frequency band so as to transform the image data to coefficient data;
an order generation section configured to determine a target bit to be encoded;
a context model section configured to create context data based on a state of context bits around the target bit;
an entropy encoder configured to input the target bit and at least some of the context data and configured to generate encoded data of the target bit by performing a probability estimation based on the encoder input context data and the target bit; and
a tag processing section configured to add tag information including a compression condition to a header of the encoded data;
wherein the context model section and the entropy encoder are operated in parallel to perform pipeline processing.

2. The compression apparatus according to claim 1, wherein the context model section comprises:
a context address generation section configured to generate context addresses; and
a context table configured to store the context data corresponding to the context addresses,
wherein the encoder input context data is readout from the context table based on a context address.

3. The compression apparatus according to claim 1, wherein the context model section comprises:
a context address generation section configured to generate context addresses; and
a context table configured to store context data corresponding to the context addresses,
wherein at least one of the respective context addresses of a plurality of target bits is selected based on a state of encoding performed by the entropy encoder, and
the encoder input context data is readout from the context table based on the selected context address.

4. The compression apparatus according to claim 1, wherein the context model section comprises:
a context address generation section configured to generate context addresses; and a context table configured to store the context data corresponding to the context addresses, wherein at least one of the respective context addresses common to a plurality of target bits is generated, a plurality of context data is readout from respective context tables based on the context address, and one of the plurality of context data is selected as the encoder input context data based on a state of encoding performed by the entropy encoder.

5. The compression apparatus according to claim 1, wherein the entropy encoder includes a finite state machine (FSM) coder.

6. The compression apparatus according to claim 1, further comprising:

a context address generation section configured to generate context addresses; and a context table configured to store the context data corresponding to the context addresses, wherein a same address from which the encoder input context data is readout from the context table is rewritten by renewal data output from the entropy encoder.

7. The compression apparatus according to claim 6, wherein the same address of the context table is readout and rewritten in one processing cycle.

8. A decompression apparatus, comprising:

an input device configured to input a codestream;

an order generation section configured to determine a target bit position based on tag information at a header of the codestream;

a context model section configured to create context data based on a state of context bits around the target bit;

an entropy decoder configured to input the codestream and at least some of the context data and configured to decode the target bit by performing a probability estimation based on the decoder input context data and the codestream; and a two-dimensional reversible wavelet reverse transform section configured to decompress image data by performing a two-dimensional reversible wavelet reverse transformation of decoded coefficient data, wherein the context model section and the entropy decoder are operated in parallel to perform pipeline processing.

9. The decompression apparatus according to claim 8, wherein the context model section comprises:

a context address generation section configured to generate context addresses; and a context table configured to store context data corresponding to the context addresses, wherein the decoder input context data is readout from the context table based on the context address.

10. The decompression apparatus according to claim 8, wherein the context model section comprises:

a context address generation section configured to generate context addresses; and a context table configured to store context data corresponding to the context addresses, wherein at least one of the respective context addresses of a plurality of target bits is selected based on a state of decoding performed by the entropy decoder, and the decoder input context data is readout from the context table using the selected context address.

11. The decompression apparatus according to claim 8, wherein the context model section comprises:

a context address generation section configured to generate context addresses; and a context table configured to store context data corresponding to the context addresses, wherein at least one of the respective context addresses common to a plurality of target bits is generated, a plurality of context data is readout from respective context tables based on the context address, and one of the plurality of context data is selected as the decoder input context data based on a state of decoding performed by the entropy decoder.

12. The decompression apparatus according to claim 8, wherein the entropy decoder includes a finite state machine (FSM) coder.

13. The decompression apparatus according to claim 8, further comprising:

a context address generation section configured to generate context addresses; and a context table configured to store the context data corresponding to the context addresses, wherein a same address from which the decoder input context data is readout from the context table is rewritten by renewal data output from the entropy decoder.

14. The decompression apparatus according to claim 13, wherein the same address of the context table is readout and rewritten in one processing cycle.

15. A compression circuitry, comprising:

an input device configured to input image data;

a two-dimensional reversible wavelet transform circuit configured to divide the image data into frequency bands and reversibly divide a low frequency band so as to transform the image data to coefficient data;

an order generation circuit configured to determine a target bit to be encoded;

a context model circuit configured to create context data based on a state of context bits around the target bit;

an entropy encoding circuit configured to input the target bit and at least some of the context data and configured to generate encoded data of the target bit by performing a probability estimation based on the encoder input context data and the target bit; and a tag processing circuit configured to add tag information including a compression condition to a header of the encoded data;

wherein the context model circuit and the entropy encoding circuit are operated in parallel to perform pipeline processing.

16. The compression circuitry according to claim 15, wherein the context model circuit comprises:

a context address generation circuit configured to generate context addresses; and a context table configured to store the context data corresponding to the context addresses, wherein the encoder input context data is readout from the context table based on a context address.

17. The compression circuitry according to claim 15, wherein the context model circuit comprises:

a context address generation circuit configured to generate context addresses; and a context table configured to store context data corresponding to the context addresses, wherein at least one of the respective context addresses of a plurality of target bits is selected based on a state of encoding performed by the entropy encoding circuit, and the encoder input context data is readout from the context table based on the selected context address.

18. The compression circuitry according to claim 15, wherein the context model circuit comprises:

a context address generation circuit configured to generate context addresses; and a context table configured to store the context data corresponding to the context addresses, wherein at least one of the respective context addresses common to a plurality of target bits is generated, a plurality of context data is readout from respective context tables based on the context address, and one of the plurality of context data is selected as the encoder input context data based on a state of encoding performed by the entropy encoding circuit.

19. The compression circuitry according to claim 15, wherein the entropy encoding circuit includes a finite state machine (FSM) coder.

20. The compression circuitry according to claim 15, further comprising:

a context address generation circuit configured to generate context addresses; and a context table configured to store the context data corresponding to the context addresses, wherein a same address from which the encoder input context data is readout from the context table is rewritten by renewal data output from the entropy encoding circuit.

21. The compression circuitry according to claim 20, wherein the same address of the context table is readout and rewritten in one processing cycle.

22. The compression circuitry according to claim 15, wherein the context model circuit and the entropy encoding circuit are provided on a same integrated circuit chip.

23. A decompression circuitry, comprising:

an input device configured to input a codestream;

an order generation circuit configured to determine a target bit position based on tag information at a header of the codestream;

a context model circuit configured to create context data based on a state of context bits around the target bit;

an entropy decoding circuit configured to input the codestream and at least some of the context data and configured to decode the target bit by performing a probability estimation based on the decoder input context data and the codestream; and a two-dimensional reversible wavelet reverse transform section configured to decompress image data by performing a two-dimensional reversible wavelet reverse transformation of decoded coefficient data, wherein the context model circuit and the entropy decoding circuit are operated in parallel to perform pipeline processing.

24. The decompression circuitry according to claim 23, wherein the context model circuit comprises:

a context address generation circuit configured to generate context addresses; and a context table configured to store context data corresponding to the context addresses, wherein the decoder input context data is readout from the context table based on the context address.

25. The decompression circuitry according to claim 23, wherein the context model circuit comprises:

a context address generation circuit configured to generate context addresses; and a context table configured to store context data corresponding to the context address addresses, wherein at least one of the respective context addresses of a plurality of target bits is selected based on a state of decoding performed by the entropy decoding circuit, and the decoder input context data is readout from the context table using the selected context address.

26. The decompression circuitry according to claim 23, wherein the context model circuit comprising:

a context address generation circuit configured to generate context addresses; and a context table configured to store context data corresponding to the context addresses, wherein at least one of the respective context addresses common to a plurality of target bits is generated, a plurality of context data is readout from respective context tables based on the context address, and one of the plurality of context data is selected as the decoder input context data based on a state of decoding performed by the entropy decoding circuit.

27. The decompression circuitry according to claim 23, wherein the entropy decoding circuit includes a finite state machine (FSM) coder.

28. The decompression circuitry according to claim 23, further comprises:

a context address generation circuit configured to generate context addresses; and a context table configured to store the context data corresponding to the context addresses, wherein a same address from which the decoder input context data is readout from the context table is rewritten by renewal data output from the entropy decoding circuit.

29. The decompression circuitry according to claim 28, wherein the same address of the context table is readout and rewritten in one processing cycle.

30. The decompression circuitry according to claim 23, wherein the context model circuit and the entropy decoding circuit are provided on a same integrated circuit chip.

31. A compression method, comprising:

inputting image data;

dividing the image data into frequency bands and reversibly dividing a low frequency band so as to transform the image data to coefficient data;

determining a target bit to be encoded;

creating context data based on a state of context bits around the target bit;

encoding the target bit by inputting the target bit and at least some of the context data and by generating encoded data of the target bit via a probability estimation based on the encoder input context data and the target bit; and adding tag information including a compression condition to a header of the encoded data;

wherein the creating of context data and generating of encoded data are performed in parallel to perform pipeline processing.

32. The compression method according to claim 31, further comprising:

generating context addresses; and storing, in a context table, the context data corresponding to the context addresses, wherein the encoder input context data is readout from the context table based on a context address.

33. The compression method according to claim 31, further comprising:

generating context addresses; and storing, in a context table, context data corresponding to the context addresses, wherein at least one of the respective context addresses of a plurality of target bits is selected based on a state of encoding the target bit, and the encoder input context data is readout from the context table based on the selected context address.

34. The compression method according to claim 31, further comprising:
generating context addresses; and
storing, in a context table, the context data corresponding to the context addresses,
wherein at least one of the respective context addresses common to a plurality of target bits is generated, a plurality of context data is readout from respective context tables based on the context address, and one of the plurality of context data is selected as the encoder input context data based on a state of encoding the target bit.

35. The compression method according to claim 31, wherein the generating of encoded data of the target bit includes processing by a finite state machine (FSM) coder.

36. The compression method according to claim 31, further comprising:
generating context addresses; and
storing, in a context table, the context data corresponding to the context addresses,
wherein a same address from which the encoder input context data is readout from the context table is rewritten by the encoded data of the target bit.

37. The compression method according to claim 36, wherein the same address of the context table is readout and rewritten in one processing cycle.

38. A decompression method, comprising:
inputting a codestream;
determining a target bit position based on tag information at a header of the codestream;
creating context data based on a state of context bits around the target bit;
decoding the target bit by inputting the codestream and at least some of the context data and by generating decoded data of the target bit via a probability estimation based on the decoder input context data and the codestream; and
decompressing image data by performing a two-dimensional reversible wavelet reverse transformation of decoded coefficient data,
wherein the creating of context data and decoding of the target bit are performed in parallel to perform pipeline processing.

39. The decompression method according to claim 38, further comprising:
generating context addresses; and
storing, in a context table, context data corresponding to the context addresses,
wherein the decoder input context data is readout from the context table based on the context address.

40. The decompression method according to claim 38, further comprising:
generating context addresses; and
storing, in a context table, context data corresponding to the context addresses,
wherein at least one of the respective context addresses of a plurality of target bits is selected based on a state of decoding the target bit, and
the decoder input context data is readout from the context table using the selected context address.

41. The decompression method according to claim 38, further comprising:
generating context addresses; and
storing, in a context table, context data corresponding to the context addresses,
wherein at least one of the respective context addresses common to a plurality of target bits is generated, a plurality of context data is readout from respective context tables based on the context address, and one of the plurality of context data is selected as the decoder input context data based on a state of decoding the target bit.

42. The decompression method according to claim 38, wherein the decoding of the target bit includes processing by a finite state machine (FSM) coder.

43. The decompression method according to claim 38, further comprising:
generating context addresses; and
storing, in a context table, the context data corresponding to the context addresses,
wherein a same address from which the decoder input context data is readout from the context table is rewritten by the decoded data of the target bit.

44. The decompression method according to claim 43, wherein the same address of the context table is readout and rewritten in one processing cycle.

* * * * *